Patented Dec. 14, 1937

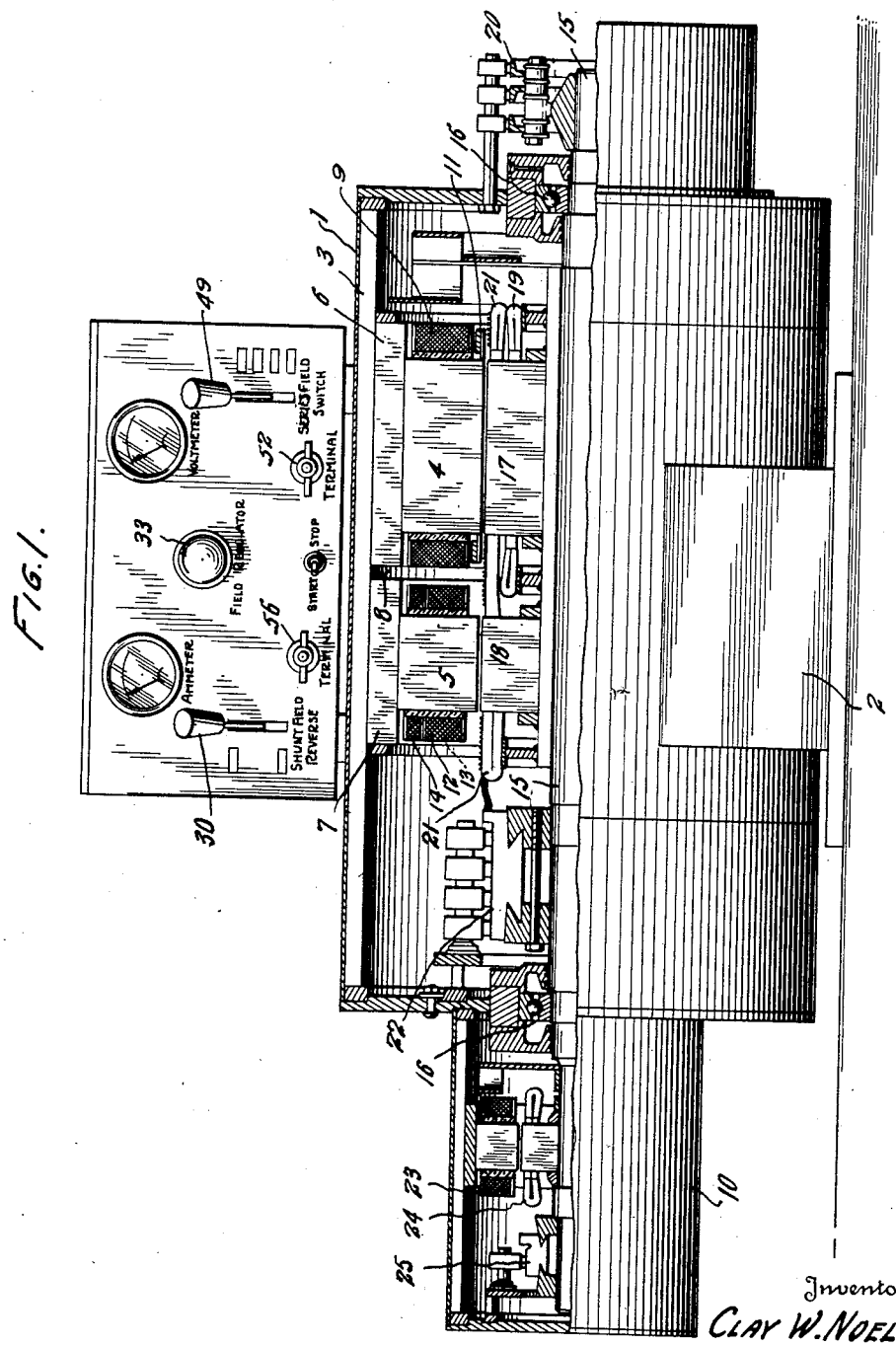

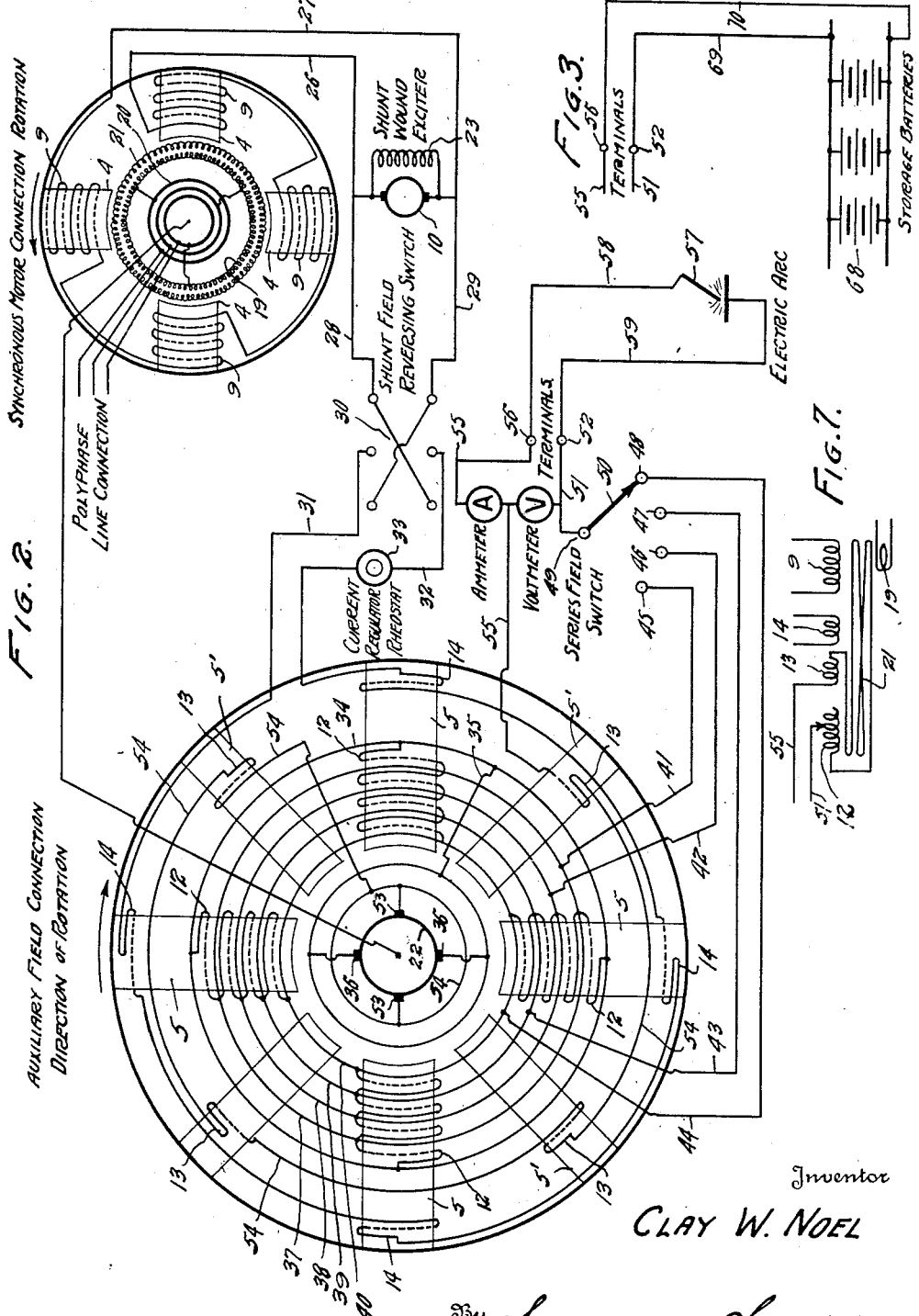

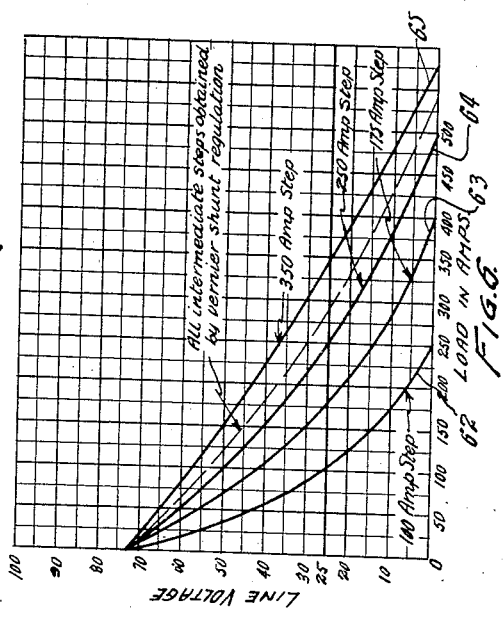
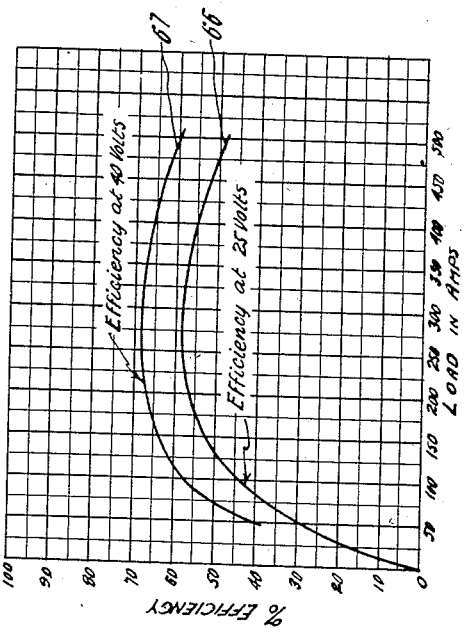
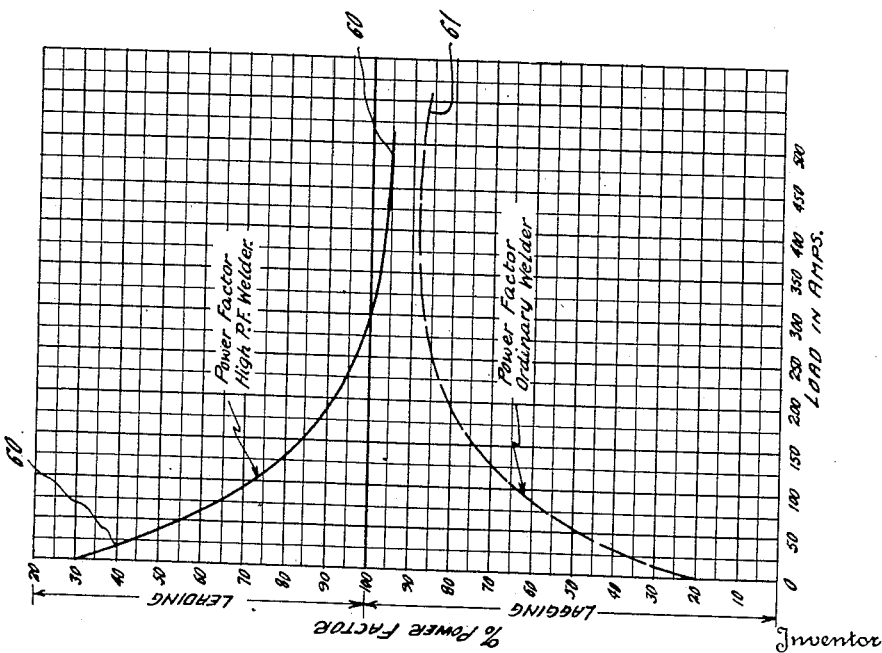

2,102,481

UNITED STATES PATENT OFFICE 2,102,481

DYNAMO MOTOR

Clay W. Noel, Mansfield, Ohio, assignor to The Ideal Electric and Manufacturing Company, Mansfield, Ohio, a corporation of Ohio Application September 26, 1934, Serial No. 745,636

14 Claims. (Cl. 171—123)

This invention relates in general to dynamo-motors and more particularly has reference to means for regulating the output of a dynamo-motor.

In many instances where it is necessary to utilize direct current, some mechanism must be provided for converting alternating current taken from an available power supply line into direct current at a potential suitable for the purpose. To accomplish this result machines have been developed which comprise a motor adapted to be driven by available power line current and a dynamo built in association therewith for generating direct current at the desired potential. This feature is embodied in some of the "welders" or electric welding machines now in commercial use.

It has been found in practice with the ordinary welder that the dampening effect of its heavy shunt coils is the main source of high inductance in the magnetic circuit. This large shunt coil, which must be capable of generating the full no load voltage of the ordinary welder, causes the machine to be sluggish and does not permit the magnetic flux and subsequently the generated voltage to change simultaneously with the rapid changes of current which occur in the welding circuit due largely to changes in the arc length. In order to give a degree of stability to the ordinary commercial welder, it is therefore necessary to add a highly inductive reactor in series with the arc in order to cause the welding current to change more slowly, such that the generated voltage can pulsate with the current pulsations of the electric arc.

Obviously the above-described disadvantages are highly objectionable, but as yet no developments have been made which completely avoid these objectionable features.

Ordinary welders are usually driven by means of an induction motor. Since ordinary welders operate a large part of the time at no load, that is, when the operator is adjusting the electrodes or changing the work, the power factor of the driving motor is abnormally low and affects the power factor of the supply system. This is entirely objectionable and it is for this reason that most power companies penalize the customer for his low power factor.

In other installations, such as battery charging machines, it has been found that in certain instances where the motor exciting field is magnetically connected to the dynamo exciting field, the motor field is reversed due to the voltage of the battery load exceeding the generated potential.

The present invention seeks to avoid these disadvantages and has as a major object the provision of a dynamo-motor having a high power factor and a higher efficiency than the prior art devices.

Another object of this invention is to devise a dynamo-motor welder having faster action of differential series field thereby reducing or eliminating the customary series reactor and improving arc stability.

A further object of this invention is to devise a dynamo-motor welder having constant energy characteristics of power supply to the electric arc.

Still another object of this invention is to provide a dynamo-motor having constant no load voltage characteristics of generator regardless of machine temperatures.

Yet another object of this invention is to provide a dynamo-motor having a motor exciting field, a dynamo exciting field magnetically separated from the motor exciting field, a rotor having an alternating current phase winding subject to influence of the motor field only and a commutated winding subject to influence of both fields, the two fields being constructed to induce opposed currents in the commutated winding, and means for varying the effect of the dynamo field.

A still further object is to provide a dynamo-motor having magnetically separated motor and dynamo exciting fields, the dynamo field comprising an adjustable series winding and a variable separately excited winding.

With these and other important objects in view, which may be incident to my improvements, the invention resides in the parts and combinations to be hereinafter set forth and claimed, with the understanding that the several necessary elements comprising my invention may be varied in construction, proportions and arrangement, without departing from the spirit and scope of the appended claims.

In order to make my invention more clearly understood, I have shown in the accompanying drawings means for carrying the same into practical effect without limiting the improvements in their useful applications to the particular constructions which, for the purposes of explanation, have been made the subject of illustration.

In the drawings:

Figure 1 is a front elevational view, partly in section, showing a dynamo-motor according to the present invention.

Fig. 2 is a schematic wiring diagram of the dynamo-motor of the present invention.

Fig. 3 is a fragmentary wiring diagram to be used in a modification of the diagram of Fig. 2.

Fig. 4 is a chart containing power factor curves.

Fig. 5 is another chart containing curves showing the relation between voltage and current under various adjustments of the dynamo exciting field.

Fig. 6 is another chart containing curves illustrating the efficiency of the dynamo-motor under various loads.

Fig. 7 is a fragmentary schematic wiring diagram showing the connection between the rotor winding and stator windings.

In Fig. 1 of the drawings there is shown a dynamo-motor mounted in a housing or casing 1 which is carried by a supporting base 2. Within the housing 1 there is a frame 3 for maintaining the stationary and movable elements of the dynamo-motor in operative relation. Frame 3 carries the stator portion of the dynamo-motor which comprises a set of pole pieces 4 and associated windings for creating a main or "motor" exciting field and a second set of pole pieces 5 and associated windings for creating an auxiliary or "dynamo" exciting field.

The term "motor winding" has been used for purposes of convenience in designating the main winding of the dynamo-motor because it is this winding which provides the direct current excitation which cooperates with a phase winding on a rotor to produce a driving effect similar to that of a synchronous motor. Since the auxiliary windings are used solely for dynamo excitation, for purposes of convenience they have been termed "dynamo windings". Other parts of the dynamo-motor associated with the main and auxiliary windings have been correspondingly identified by the adjectives "motor" and "dynamo".

Pole pieces 4 are formed of suitable laminated material and are carried by a laminated yoke 6. Pole pieces 5 are similarly laminated and are carried by a laminated yoke 7. At this point it should be noted that the pole pieces 4 and yoke 6 are separated from pole pieces 5 and yoke 7 by means of an air gap 8 to avoid interlinkage of the magnetic flux in the two separate sets of pole pieces.

For setting up flux in pole pieces 4, a winding 9 is provided which is excited by an exciter 10 driven by the dynamo-motor (see Figs. 1 and 2). In addition, there is associated with pole pieces 4 a pole face squirrel-cage winding 11 which is used in starting the dynamo-motor.

A plurality of windings are associated with pole pieces 5. One winding 12 is tapped, as will be more fully described, and is in series with a rotor winding and another field winding 13, associated with interpole pieces 5'. The other winding 14 is separately excited and its effect is variable.

The rotor 15 is mounted in bearings 16 carried in the end pieces of the dynamo-motor. Laminated cores 17 and 18 are carried by the rotor and are positioned to cooperate with pole pieces 4 and 5, respectively. Core 17 carries a winding 19 which is connected by means of collector rings 20 with a source of polyphase alternating current for driving the dynamo-motor. Winding 19 corresponds to a "phase winding" of a synchronous motor.

At this point I wish to point out that the dynamo-motor of this invention is driven as a synchronous motor which avoids the disadvantages of the prior art devices. In this connection the core 17 and the phase winding 19 cooperate with pole pieces 4 to provide for the synchronous drive. In starting, the squirrel-cage winding 11 is used to bring the rotor to synchronous speed and then direct current is applied to winding 9 to provide the necessary direct current excitation.

In addition to winding 19, the rotor is also provided with a winding 21 which I term the "commutated winding". This winding passes through the slots of both cores 17 and 18 and has its terminals connected to a commutator 22. With this arrangement, winding 21 is affected by the main field of the dynamo-motor including the winding 9 and also by the auxiliary field which includes the windings 12, 13 and 14.

The exciter for exciting the windings 9 and 14 may comprise a small shunt wound direct current generator 10 mounted on one end of the dynamo-motor. As shown in Figs. 1 and 2, this generator comprises a field 23, an armature 24 formed on an extension of rotor shaft 15, and a commutator 25.

As shown in Fig. 2, the exciter is connected by wires 26 and 27 with the winding 9 of the main field. In addition, the exciter is connected by wires 28 and 29 with the poles of a double throw reversing switch 30 which, in turn, is connected by wires 31 and 32 with the shunt or direct current exciting winding 14 of the auxiliary field. By interposing the reversing switch in the circuit connecting the exciter to the winding 14 it is possible to reverse the direction of flow of the current passing through winding 14 and thereby increase or decrease the flux in the auxiliary field by creating a flux which adds to the flux produced by the other windings 12 and 13 or a flux which bucks the flux created by windings 12 and 13, and therefore reduces it. To vary the value or intensity of the flux created by winding 14 a rheostat 33 is positioned in conductor 32 for varying the amount of current flowing therethrough.

Windings 12, as indicated schematically in the drawings, are parallelly connected at one end by a conductor 34 which, in turn, is connected by wire 35 and brushes 36 of commutator 22 with the commutated rotor winding 21. In addition, the tapped portions of windings 12 are parallelly connected by conductors 37, 38, 39 and 40 which, in turn, are connected by leads 41, 42, 43 and 44 with switch points 45, 46, 47 and 48, respectively. These switch points are part of a series field switch 49, the arm 50 of which is connected by wire 51 to a terminal 52. By adjusting the position of switch arm 50, the intensity of the field set up by current flowing through winding 12 can be varied. This variation, taken in conjunction with the variation afforded by the separately excited shunt winding 14, makes it possible to minutely vary the intensity of the auxiliary field to meet the requirements of a given situation. Windings 12 and 14 are so constructed that variations produced by operating reversing switch 30 and rheostat 33 serve as a means of obtaining vernier adjustments between the adjacent switch points of switch 49. Thus, very fine adjustments of the effect produced by the auxiliary field can be obtained.

The other end of the commutated rotor winding 21 is connected through commutator 22, brushes 53 and conductors 54 with windings 13 which, in turn, are connected by lead 55 to terminal 56.

It will be noted that there are the same number of poles 4 as there are poles 5, the interpoles 5' not affecting this relation. The polarity of poles 4 is opposite to that of poles 5 and, consequently, opposed currents are induced in the commutated winding 21. The synchronous speed of the rotor 15 is determined by the number of poles 4 on any given frequency of polyphase power supply, and while I have shown in the drawings a machine having a four-pole, interpole auxiliary field and a four-pole synchronous field I wish it to be clear that this showing is not limitative, but merely illustrative.

If the dynamo-motor herein described is to be used to supply current to an arc welding circuit, electrode 57 and the article to be welded are connected by leads 58 and 59, respectively, to terminals 56 and 52.

In operation phase winding 19 and squirrel-cage winding 11 are connected to a polyphase current supply line and as the rotor reaches synchronous speed the main field winding 9 is excited by connecting the same to exciter 10 to provide direct current excitation which effects rotation of rotor 15 at synchronous speed. Phase winding 19 is acted upon only by the main field produced by winding 9.

The rotation of the commutated winding 21 through the field created by winding 9 induces a current to flow in winding 21 in one direction. Also, the auxiliary windings 12, 13 and 14 collectively induce a current in winding 21 which is in opposition to that induced by winding 9. In other words, series differential winding 12 supplies the magneto-motive force for the auxiliary field when load is thrown on the converter and establishes the polarity of poles 5 in such a manner that there is generated a voltage in that portion of winding 21 passing through auxiliary core 18 which is in direct opposition to the voltage generated in that portion of commutated winding 21 passing through main core 17.

Upon striking an arc, a current (induced by main field winding 9) will flow through the circuit including the serially connected commutated winding 21, tapped auxiliary winding 12, terminal 52, the arc, terminal 56 and winding 13. Since the current flowing through this circuit excites windings 12 and 13 of the auxiliary series field, there is, as explained above, an electromotive force induced in winding 21 in opposition to that induced by main field winding 9. Consequently, as the current in the arcing circuit is increased, the flux of the auxiliary field increases and the E. M. F. induced thereby increases in opposition to that induced by winding 9 and tends to reduce the current flowing in the arcing circuit. This feature of my invention prevents excessive currents flowing through the arcing circuit upon fall of the resistance of the arc.

As explained herein before, the effect of the auxiliary field can be adjustably varied by means of the series field switch 49 associated with tapped winding 12 and the reversing switch 30 and rheostat 33 associated with winding 14. With this construction, desired welding currents can be obtained.

It is to be noted that this invention produces an economy in power consumption by lowering the no load voltage of the dynamo-motor from say 75 volts to 20-25 volts as required by the electric arc. This lowering of the generated voltage under current drawn for the electric arc is produced by the action of the series differential, auxiliary, magnetic field acting on a portion of commutated winding 21. Since the current changes rapidly in the series field 12, the magnetic flux changes rapidly and produces a quick change in the voltage generated in the winding 21. Therefore, because of the low inductance and reluctance of the magnetic auxiliary field, it is possible to obtain relative stability of the electric arc without the necessity of using the series reactor commonly used with the ordinary commercial welding generators. This low inductance of the auxiliary series field 12 is produced by building this circuit with minimum magnetic reluctance, minimum turns and with minimum size of shunt coil 14. In addition, the magnetic circuit is entirely laminated in order that a minimum of eddy currents will be produced which would dampen the rate of change of welding current through the series coils 12. It has been found in practice with the ordinary welder that the dampening effect of its heavy shunt coils is the main source of high inductance in the magnetic circuit. This large shunt coil, which must be capable of generating the full no load voltage of the ordinary welder, causes the machine to be sluggish and does not permit the magnetic flux and subsequently the generated voltage to change simultaneously with the rapid changes of current which occur in the welding circuit due largely to changes in the arc length. In order to give a degree of stability to the ordinary commercial welder, it is therefore necessary to add a highly inductive reactor in series with the arc in order to cause the welding current to change more slowly, such that the generated voltage can pulsate with the current pulsations of the electric arc. Furthermore, the ordinary welder has the series differential field acting upon the main magnetic flux of the generator, whereas in the invention herein described, the series differential field acts only on the auxiliary field and does not effect the main magnetic flux. The result is that there is less interlinkage of magnetic flux with the series field which causes a lower co-efficient of inductance and thereby a series field which can change more rapidly. This fast-changing field permits the voltage to follow closely to the welding current. The result is a more stable arc and less spluttering.

By combining a series field of minimum inductance with a small shunt coil of negligible dampening effect, the welder of this invention does not require a series reactor in the welding circuit to obtain stability in welding operation.

Moreover, by combining the driving motor with a part of the generating circuit in the dynamo-motor, as herein described, and the elimination of the series reactor with its inherent high power losses, the efficiency of power conversion is improved over the methods commonly used wherein a separate induction motor is used with the usual highly inductive reactor in the arc circuit.

As explained herein before, the prior art welders are usually driven by means of an induction motor. Since these welders operate a large part of the time at no load, that is, when the operator is adjusting the electrodes or changing the work, the power factor of the driving motor is abnormally low and affects the power factor of the supply system. This is entirely objectionable and it is for this reason that most power companies penalize the customer for his low power factor.

With the device herein described, it will be noted that the dynamo-motor arrangement with the armature windings 19 and 21 and the field poles 4 with exciting winding 9 operates essentially as a synchronous motor. By the proper adjustment of the current flowing in the field coils 9, the dynamo-motor can be made to run at synchronism and supply unity or 100% power factor in the phase winding 19 which connects through the collector rings 20 to the power supply line. By unity or 100% power factor is meant that the current and voltage are in phase. This high power factor is very desirable for a welding device, as explained above.

Reference is now made to Fig. 4 of the drawings which shows the power factor curve 60 of this device. It will be noted that at the normal load of 300 amperes, the power factor at full load is 100%. At loads less than full load, the power factor becomes leading, wherein the current drawn from the supply system leads the voltage. At light loads, it is desirable that a welding device have a leading power factor, since with leading power factor a certain amount of power factor correction is obtained on power supply systems which normally have a lagging power factor caused by the operation of inductive apparatus. Referring to curve 61 in Fig. 4, it will be noted that the power factor of the ordinary welder driven by an induction motor is always lagging, that is, below 100%. At light loads and no load this power factor becomes very low and seriously affects the power factor of the power supply system. Since most power companies have penalty and bonus arrangements in their power supply schedules which relate to power factor, it can readily be seen that the cost of operation of my device on such power systems will be considerably less.

Reference is made to the curves 62, 63, 64 and 65 shown in Fig. 5, wherein the volt-ampere characteristics of my welding device are shown. Four steps of welding current are shown, namely 350, 250, 175 and 100 amperes at 25 volts. These various steps are obtained by changing taps brought out of the series differential field coils 12 mounted upon the auxiliary poles 5. One method of obtaining these various current adjustments is shown in Fig. 2, although other methods could be used which would obtain the same results. The shunt coils 14 simply perform the function of a vernier adjustment enabling the operator to obtain intermediate steps by changing the no load voltage of the welder. Such close regulation of welding current is obtained by adjusting the rheostat 33 to allow more or less current to flow through the shunt coils 14 from the separate exciter 10. By means of the shunt field reversing switch, the magnetic field of the shunt coils 14 can be made to either raise or lower the no load voltage of the welder, thereby obtaining the maximum of welding current adjustment with a minimum size of shunt coils.

It will be noted that the form of the volt-ampere curves 62, 63, 64 and 65 are not straight lines, but are curved and tend to approach the curve of a hyperbola in outline. This means that through small ranges of welding current the product of amperes and volts approach a constant, in other words, the watt energy output of the welder approaches a constant, regardless of generator voltage. Constant energy, which is dissipated in the arc as heat, is desirable in a welding generator since the amount of heat applied to the weld is constant and not affected by the length of arc. The shape of these volt-ampere curves is determined only by the magnetic saturation of the auxiliary differential series field. It can be readily seen that the saturation of a welder of this type can be varied over a large range and almost any degree of constant energy characteristics obtained.

Referring to Figs. 1 and 2, it will be noted that the excitation for the vernier shunt field 14 and the dynamo-motor field 9 is derived from the shunt wound exciter 10. This exciter is usually direct connected and driven at the same speed as the dynamo-motor. The exciter is shown as shunt wound without the customary shunt field regulating rheostat. The exciter is worked at a high saturation in order that its voltage will be approximately constant regardless of machine temperatures.

Ordinary welding generators do not have constant voltage when the machine temperature varies. For instance, when the operator starts the machine when it is cold, he will find that the no load voltage is higher than when the machine has assumed the final temperature under load. This is due to the fact that the shunt field has higher resistance when hot than when cold. In the welder which I have described, the no load voltage is the same whether the machine is cold or hot. This sameness of voltage is due to the fact that the no load voltage depends mainly upon the effective turn ratio of the windings 19 and 21 and the line voltage impressed on the collector rings 20 connected to phase winding 19. In other words, the dynamo-motor arrangement may be considered as a rotating transformer, the temperature of which does not change the ratio of primary and secondary voltages. This characteristic is highly desirable in welding generators since it means that the welding current in the arc circuit is constant, regardless of machine temperatures. This is particularly true where automatic welding is done and a fixed adjustment of welding current desired.

To illustrate the efficiency of my device, I have shown in Fig. 6 curves 66 and 67 depicting the variations in efficiency when operating at 25 and 40 volts, respectively.

As before explained, the dynamo-motor herein described is useful for purposes other than welding and in Fig. 3 I have shown a group of batteries 68 connected by leads 69 and 70 to terminals 52 and 56. Of course, other applications of the present invention may be made.

From the foregoing, it will be realized that the present invention provides a device which has many advantageous features and which is free from the disadvantages of the prior art devices described hereinbefore.

While I have shown and described the preferred embodiment of my invention, I wish it to be understood that I do not confine myself to the precise details herein set forth by way of illustration as it is apparent that many changes and variations may be made therein by those skilled in the art, without departing from the spirit of the invention or exceeding the scope of the appended claims.

I claim:

1. A combined dynamo and synchronous motor to supply current to a current consuming load comprising a stator, a set of pole pieces and an exciting winding for the synchronous motor carried by said stator, a magnetically independent set of pole pieces carried by said stator adapted to provide a dynamo exciting field, a rotor, independent motor and dynamo cores carried by said rotor, an alternating current fed winding on said motor core, a second winding on said rotor common to both of said cores, said second rotor winding being conductively insulated from said other rotor winding but inductively coupled thereto, a plurality of tapped windings associated with the dynamo exciting field pole pieces, and means for serially connecting said tapped windings with said second core winding and the current consuming load.

2. A combined dynamo and synchronous motor to supply current to a current consuming load comprising a stator, a set of pole pieces and an exciting winding for the synchronous motor carried by said stator, a magnetically independent set of pole pieces carried by said stator adapted to provide a dynamo exciting field, a rotor, independent motor and dynamo cores carried by said rotor, an alternating current fed winding on said motor core, a second winding on said rotor common to both of said cores, said second rotor winding being conductively insulated from said other rotor winding but inductively coupled thereto, a plurality of tapped windings associated with the dynamo exciting field pole pieces, means for serially connecting said tapped windings with said second core winding and the current consuming load, and a separately excited winding associated with the dynamo pole pieces.

3. A combined dynamo and synchronous motor to supply current to a current consuming load comprising a stator, a set of pole pieces and an exciting winding for the synchronous motor carried by said stator, a magnetically independent set of pole pieces carried by said stator adapted to provide a dynamo exciting field, a rotor, independent motor and dynamo cores carried by said rotor, an alternating current fed winding on said motor core, a second winding on said rotor common to both of said cores, said second rotor winding being conductively insulated from said other rotor winding but inductively coupled thereto, a plurality of tapped windings associated with the dynamo exciting field pole pieces, means for serially connecting said tapped windings with said second core winding and the current consuming load, a separately excited winding associated with the dynamo pole pieces, and means for rendering the effect of said separately excited dynamo field winding additive or differential with respect to said tapped windings.

4. A combined dynamo and synchronous motor to supply current to a current consuming load comprising a stator, a set of pole pieces and an exciting winding for the synchronous motor carried by said stator, a magnetically independent set of pole pieces carried by said stator adapted to provide a dynamo exciting field, a rotor, independent motor and dynamo cores carried by said rotor, an alternating current fed winding on said motor core, a second winding on said rotor common to both of said cores, said second rotor winding being conductively insulated from said other rotor winding but inductively coupled thereto, a plurality of tapped windings associated with the dynamo exciting field pole pieces, means for serially connecting said tapped windings with said second core winding and the current consuming load, a separately excited winding associated with the dynamo pole pieces, and means for varying the effect of the separately excited dynamo field winding.

5. A combined dynamo and synchronous motor to supply current to a current consuming load comprising a stator, a set of pole pieces and an exciting winding for the synchronous motor carried by said stator, a magnetically independent set of pole pieces carried by said stator adapted to provide a dynamo exciting field, a rotor, independent motor and dynamo cores carried by said rotor, an alternating current fed winding on said motor core, a second winding on said rotor common to both of said cores, said second rotor winding being conductively insulated from said other rotor winding but inductively coupled thereto, a plurality of tapped windings associated with the dynamo exciting field pole pieces, a commutator to which said tapped windings are connected, means for serially connecting said commutator with said second core winding and the current consuming load, a separately excited winding associated with the dynamo pole pieces, means for rendering the effect of said separately excited dynamo field winding additive or differential with respect to said tapped windings, and means for varying the intensity of the additive and differential effect.

6. A combined dynamo and synchronous motor to supply current to a current consuming load comprising a stator, a set of pole pieces and an exciting winding for the synchronous motor carried by said stator, a magnetically independent set of pole pieces carried by said stator adapted to provide a dynamo exciting field, a rotor, independent motor and dynamo cores carried by said rotor, an alternating current fed winding on said motor core, a second winding on said rotor common to both of said cores, said second rotor winding being conductively insulated from said other rotor winding but inductively coupled thereto, a plurality of tapped windings associated with the dynamo exciting field pole pieces, a commutator to which said tapped windings are connected, means for serially connecting said commutator with said second core winding and the current consuming load, a separately excited winding associated with the dynamo pole pieces, and means common to said synchronous motor stator winding and the separately excited dynamo field winding for supplying exciting current to both of said windings.

7. A combined dynamo and synchronous motor to supply current to a current consuming load comprising a stator, a set of pole pieces and an exciting winding for the synchronous motor carried by said stator, a magnetically independent set of pole pieces carried by said stator adapted to provide a dynamo exciting field, a rotor, independent motor and dynamo cores carried by said rotor, an alternating current fed winding on said motor core, a second winding on said rotor common to both of said cores, said second rotor winding being conductively insulated from said other rotor winding but inductively coupled thereto, a plurality of tapped windings associated with the dynamo exciting field pole pieces, and means for serially connecting said tapped windings with said second core winding and the current consuming load, said synchronous motor stator winding and said dynamo field windings being constructed to induce opposed currents in said common rotor winding.

8. A combined dynamo and synchronous motor to supply current to a curent consuming load comprising a stator, a set of pole pieces and an exciting winding for the synchronous motor carried by said stator, a magnetically independent set of pole pieces carried by said stator adapted to provide a dynamo exciting field, a rotor, independent motor and dynamo cores carried by said rotor, an alternating current fed winding on said motor core, a second winding on said rotor common to both of said cores, said second rotor winding being conductively insulated from said other rotor winding but inductively coupled thereto, a plurality of tapped windings associated with the dynamo exciting field pole pieces, means for serially connecting said tapped windings with said second core winding and the current consuming load, said synchronous motor stator winding and said dynamo field windings being constructed to induce opposed currents in said common rotor winding, and a separately excited winding associated with the dynamo pole pieces.

9. A combined dynamo and synchronous motor to supply current to a current consuming load comprising a stator, a set of pole pieces and an exciting winding for the synchronous motor carried by said stator, a magnetically independent set of pole pieces carried by said stator adapted to provide a dynamo exciting field, a rotor, independent motor and dynamo cores carried by said rotor, an alternating current fed winding on said motor core, a second winding on said rotor common to both of said cores, said second rotor winding being conductively insulated from said other rotor winding but inductively coupled thereto, a plurality of tapped windings associated with the dynamo exciting field pole pieces, means for serially connecting said tapped windings with said second core winding and the current consuming load, said synchronous motor stator winding and said dynamo field windings being constructed to induce opposed currents in said common rotor winding, a separately excited winding associated with the dynamo pole pieces, and means for varying the effect of the separately excited dynamo field winding.

10. A combined dynamo and synchronous motor to supply current to a current consuming load comprising a stator, a set of pole pieces and an exciting winding for the synchronous motor carried by the said stator, a magnetically independent set of pole pieces carried by said stator adapted to provide a dynamo exciting field, a rotor, independent motor and dynamo cores carried by said rotor, an alternating current fed winding on said motor core, a second winding on said rotor common to both of said cores, said second rotor winding being conductively insulated from said other rotor winding but inductively coupled thereto, a plurality of tapped windings associated with the dynamo exciting field pole pieces, and means for connecting said tapped windings from said second core winding and the current consuming load.

11. A combined dynamo and synchronous motor to supply current to a current consuming load comprising a stator, a set of pole pieces and an exciting winding for the synchronous motor carried by said stator, a magnetically independent set of pole pieces carried by said stator adapted to provide a dynamo exciting field, a rotor, independent motor and dynamo cores carried by said rotor, an alternating current fed winding on said motor core, a second winding on said rotor common to both of said cores, said second rotor winding being conductively insulated from said other rotor winding but inductively coupled thereto, a plurality of tapped windings associated with the dynamo exciting field pole pieces, means for connecting said tapped windings with said second core windings and the current consuming load and a separately excited winding associated with the dynamo pole pieces.

12. A combined dynamo and synchronous motor to supply current to a current consuming load comprising a stator, a set of pole pieces and an exciting winding for the synchronous motor carried by said stator, a magnetically independent set of pole pieces carried by said stator adapted to provide a dynamo exciting field, a rotor, independent motor and dynamo cores carried by said rotor, an alternating current fed winding on said motor core, a second winding on said motor common to both of said cores, said second rotor winding being conductively insulated from said other rotor winding but inductively coupled thereto, a plurality of tapped windings associated with the dynamo exciting field pole pieces, means for connecting said tapped windings with said second core windings, and the current consuming load, a separately excited winding associated with the dynamo pole pieces, and means for rendering the effecting of said separately excited dynamo field windings additive or differential with respect to said tapped windings.

13. A combined dynamo and synchronous motor to supply current to a current consuming load comprising a stator, a set of pole pieces and an exciting winding for the synchronous motor carried by said stator, a magnetically independent set of pole pieces carried by said stator adapted to provide a dynamo exciting field, a rotor, independent motor and dynamo cores carried by said rotor, an alternating current fed winding on said motor core, a second winding on said rotor, common to both of said cores, said second rotor winding being conductively insulated from said other rotor winding but inductively coupled thereto, a plurality of tapped windings associated with the dynamo exciting field pole pieces, means for connecting said tapped windings with said second core winding and the current consuming load, a separately excited winding associated with the dynamo pole pieces, and means for varying the effect of the separately excited dynamo field winding.

14. A combined dynamo and synchronous motor to supply current to a current consuming load comprising a stator, a set of pole pieces and an exciting winding for the synchronous motor carried by said stator, a magnetically independent set of pole pieces carried by said stator adapted to provide a dynamo exciting field, a rotor, independent motor and dynamo cores carried by said rotor, an alternating current fed winding on said motor core, a second winding on said rotor common to both of said cores, said second rotor winding being conductively insulated from said other rotor winding but inductively coupled thereto, a plurality of tapped windings associated with the dynamo exciting field pole pieces, and means for connecting said tapped windings with said second core winding and the current consuming load, said synchronous motor stator winding and said dynamo field windings being constructed to induce opposed currents in said common rotor winding.

CLAY W. NOEL.